United States Patent [19]

Nguyen

[11] Patent Number: 5,859,105
[45] Date of Patent: Jan. 12, 1999

[54] ORGANOSILICON-CONTAINING COMPOSITIONS CAPABLE OF RAPID CURING AT LOW TEMPERATURE

[75] Inventor: My N. Nguyen, Poway, Calif.

[73] Assignee: Johnson Matthey, Inc., Valley Forge, Pa.

[21] Appl. No.: 798,864

[22] Filed: Feb. 11, 1997

[51] Int. Cl.$^6$ ................................................. C08K 3/38
[52] U.S. Cl. .................. 524/404; 252/511; 252/514; 523/210; 524/185; 524/434; 524/588; 524/701; 524/780; 524/862; 524/440; 524/787
[58] Field of Search ................... 252/511, 514; 523/210; 524/185, 434, 588, 701, 780, 862, 404, 440, 787

[56] References Cited

U.S. PATENT DOCUMENTS

| | | | |
|---|---|---|---|
| 4,877,820 | 10/1989 | Cowan | 523/222 |
| 4,900,779 | 2/1990 | Leibfried | 524/862 |
| 4,902,731 | 2/1990 | Leibfried | 523/222 |
| 5,008,360 | 4/1991 | Bard et al. | 528/25 |
| 5,013,809 | 5/1991 | Leibfried, Sr. | 524/862 |
| 5,025,048 | 6/1991 | Burnier | 524/99 |
| 5,068,303 | 11/1991 | Bard et al. | 528/25 |
| 5,077,134 | 12/1991 | Leibfried, Sr. | 428/447 |
| 5,118,735 | 6/1992 | Burnier | 524/99 |
| 5,124,375 | 6/1992 | Leibfried | 523/222 |
| 5,124,423 | 6/1992 | Leibfried | 528/15 |
| 5,147,945 | 9/1992 | Woodside | 525/475 |
| 5,171,817 | 12/1992 | Barnum et al. | 528/15 |
| 5,196,498 | 3/1993 | Leibfried, Sr. | 528/15 |
| 5,242,979 | 9/1993 | Barnum et al. | 525/106 |
| 5,298,536 | 3/1994 | Babcock et al. | 523/201 |
| 5,451,637 | 9/1995 | Leibfried | 525/105 |

OTHER PUBLICATIONS

OSI Specialties Product Information, "Silquest Silanes Products and Applications", Oct. 1996, 3 pages.
Bard et al., "Processing and Properties of Silicon–Carbon Liquid Encapsulants", IEEE, 1993, pp. 742–747.
Bard et al., "A New Moisture Resistant Liquid Encapsulant", IEEE, 1992, pp. 1018–1022.
Dow Plastics, "Plastiscope", Modern Plastics, Dec. 1996.
Pennisi et al., "A New Liquid Encapsulant for IC Packaging", IEEE, 1992, pp. 1015–1017.
Ricon Resins, Inc., "Ricons . . . Highly Reactive, Heat Resistant, Unique Thermosetting Liquid Resin Systems", Product Bulletin, Dec. 1991, pp. 1–9.

*Primary Examiner*—Melvyn I. Marquis
*Attorney, Agent, or Firm*—Christie, Parker & Hale, LLP

[57] ABSTRACT

Described is an organosilicon-containing composition suitable for use as an adhesive and capable of rapid curing at low temperature. The composition comprises about 10 to 80 wt. % of an organic compound component and about 20 to 90 wt. % of one of boron nitride or silver. The organic compound component comprises the reaction product of about 40 to 90 wt. % of the reaction product of cyclic olefin and cyclic siloxane and about 10 to 60 wt. % rubber in liquid form.

11 Claims, No Drawings

ORGANOSILICON-CONTAINING COMPOSITIONS CAPABLE OF RAPID CURING AT LOW TEMPERATURE

BACKGROUND OF THE INVENTION

Organosilicon compositions have superior moisture resistance compared to epoxies, such as epoxy compositions that have been used as adhesives in electronic applications in, for example, the semiconductor packaging industry. However, prior efforts to increase toughness by formulating organosilicon compositions such as described in Leibfried U.S. Pat. No. 5,451,637 and Barnum U.S. Pat. No. 5,242,979 thermoset with very high crosslink density when fully cured and, as a result, are quite brittle and not suitable as adhesives for the IC packages to which they are intended because they tend to crack when subjected to mechanical stress such as thermal cycling/thermal shock.

Moisture-resistant organosilicon compositions, especially compositions with varying modulus of elasticity, are disclosed in co-pending application Ser. No. 081629,826 now abandoned filed Apr. 10, 1996. It has now been discovered that such compositions may be toughened further to increase their usefulness as an adhesive for electronic applications. The disclosure of the aforementioned application is expressly incorporated herein by reference.

The present invention provides a novel organosilicon-containing composition suitable for use as an adhesive and capable of rapid curing at low temperature.

SUMMARY OF THE INVENTION

In accordance with the invention, there is provided an organosilicon-containing composition comprising about 10 to 80 wt. % of an organic compound component, e.g., resin mixture, and about 20 to 90 wt. % of one of boron nitride and silver. The organic compound component comprises the reaction product of about 40 to 90 wt. % of the reaction product of cyclic olefin and cyclic siloxane, and about 10 to 60 wt. % rubber in liquid form. In one embodiment, the composition comprises about 20 to 50 wt. % boron nitride, and in another embodiment the composition comprises about 60 to 90 wt. % silver particles. Advantageously, the organic compound component further comprises about 1 to 5 wt. % of platinum catalyst preferably in liquid form, and about 2 to 10 wt. % of vinyl silane. A rheology adjusting agent, such as silica of particles less than about 1 micron in size, may also be added. Compositions as described are suitable for use as an adhesive and are capable of rapid curing at low temperature, e.g., not more than about three hours at 150° C.

DETAILED DESCRIPTION

In accordance with the invention a resin system may be toughened to increase usefulness as an adhesive for electronic applications by adding softer filler particles such as boron nitride or electrically conductive formulations of metal fillers such as silver, copper, etc. At the present time, silver particles, e.g., flakes, are preferred because of good electrical conductivity and as toughness enhancement. It has been determined that the resin system without fillers as described does not have sufficient or adequate toughness to make it practical for use as a die attach/encapsulant formulation. The addition of appropriate fillers develops the properties useful for these applications.

The addition of fillers such as boron nitride or silver imparts desirable toughness without exhibiting cracks, even after temperature cycling from −65° C. to 150° C. Boron nitride particles are especially advantageous because they are much softer and less abrasive compared to other ceramic fillers such as silica glass. Compositions with boron nitride exhibit a thermal conductivity two to three times higher than silica, which is especially advantageous for die attach/encapsulant applications.

Electrically conductive compositions containing silver are desirable for many applications in the electronic industry. However, commercially available particulate silver, such as silver flakes, generally have lubricants, e.g., surfactants, coated on the surfaces of the particles. Such materials are added during the particulizing, i.e., flaking process, to control particle sizes and to preclude particle agglomeration. Most common lubricants are fatty acids, fatty acid esters, fatty alcohols or mixtures such as stearic acid, behenic acid, metal stearate, etc., commonly present in amounts of about 0.1 to 1%. These lubricants tend to have a detrimental effect on the curing reaction of organosilicon compositions and can result in little or no curing. It is advantageous to remove the lubricant by washing the flake with appropriate solvents such as acetone and then filtering and drying. However, even after washing, some amount of lubricant will generally remain.

Organosilicon-containing compositions may be formulated with about 10 to 80 wt. % of an organic compound component and about 20 to 90 wt. % of one of boron nitride and silver. The organic compound component, hereinafter sometimes referred to as "resin mixture," comprises a reaction product of about 40 to 90 wt. % of the reaction product of cyclic olefin and cyclic siloxane, and about 10 to 60 wt. % rubber in liquid form. The reaction product of cyclic olefin and cyclic siloxane is available from Hercules, Inc. of Wilmington, Del., under the trade name "Sycar", and a suitable liquid rubber is available from Ricon Resins, inc., Grand Junction, Colo., under the trade name "Ricon", which is a liquid polybutadiene rubber. It is desirable for the resin mixture to be formulated as a liquid so that a paste can be made by the addition of particles of silver or boron nitride. Advantageously, a vinyl silane, such as available under the trade name A172 from OSI Specialties, may be added to enhance the adhesion. It is also advantageous to incorporate a platinum catalyst such as available under the trade name PC085 from Huels America, Inc., Piscataway, N.J., which is a platinum siloxane having about 2 wt. % platinum. Suitable platinum catalysts include platinum, divinyl, tetramethyldisiloxane which is a liquid form, or dichloro-1,5-cyclooctadieneplatinate, which is a powder form. The Sycar is available as a prepolymer which contains about 30 ppm platinum as a catalyst. With no additional amount of platinum catalyst added, the mixtures of Sycar and liquid rubber require several hours at 160° C. to fully cure (according to Leibfried '637). By adding additional amounts of platinum-containing catalyst, such as platinum cyclovinylmethylsiloxane ("PC 085") at an appropriate level, e.g., greater than 100 ppm, a low temperature/fast cure adhesive composition may be formulated which is well suited for applications in semiconductor packages. Such compositions demonstrate differential scanning colorimetry (DSC) desirable peaks of less than about 150° C., preferably less than about 100° C. The DSC peak is determined by heating an uncured sample at 5° to 10° C. per minute and then measuring the amount of heat given off by the curing reaction. When the reaction starts, more heat is given off. The DSC peak is therefore the temperature at which the maximum curing reaction occurs.

The following examples illustrate compositions within the scope of the invention which comprise mixtures of organosilicon prepolymers, unsaturated liquid rubber, platinum-containing catalyst and thermally or electrically conducting fillers. Preferred fillers must be soft and less abrasive to increase toughness of the organosilicon-containing composition. In Table 1 below, six examples of compositions formulated as described, with and without platinum catalyst, are shown together with the DSC peak temperatures.

TABLE 1

|  | A | B | C | D | E | F |
|---|---|---|---|---|---|---|
| Sycar | 75 | 73.2 | 65 | 63.4 | 60 | 58.5 |
| Ricon 130 | 25 | 24.3 | 35 | 34.1 | 40 | 39 |
| PC 085 | — | 2.5 | — | 2.5 | — | 2.5 |
| DSC Peak | 160° C. | 90° C. | 156° C. | 90° C. | 152° C. | 89° C. |

Example F in Table 1 is an illustration of a low temperature/fast cure organosilicon-containing composition which is suitable for die attach/encapsulant materials for IC packages which include organic polymer substrates such as BT, FR4 laminate, polyimide film, etc., all of which have a significant amount of absorbed moisture. Outgassing of absorbed moisture during thermal processing causes voids in the die attach/encapsulant or delamination and other problems affecting reliability. Example F would provide void-free bonding and a rapid cure cycle. Table 2 below indicates the cure temperature and gelation time of Example F.

TABLE 2

| Cure Temperature, °C. | 30 | 55 | 100 | 150 |
|---|---|---|---|---|
| Gelation Time | 48 hours | 1.4 hours | 40 seconds | 15 seconds |

To illustrate the effect of various fillers on the composition, the examples in Tables 3 and 4 were prepared for organosilicon-containing compositions with boron nitride and silver, respectively. The examples in Table 3 (Samples G, H, I and J) were tested for viscosity, modulus, percent moisture absorption, adhesion strength, thermal cycling (to show whether the composition cracked or did not crack) and thermal conductivity. It can be seen that compositions with boron nitride can be formulated that have high adhesion strength, high thermal conductivity and good thermal cycling properties (i.e., no cracking).

TABLE 3

|  | G | H | I | J |
|---|---|---|---|---|
| Sycar | 23.0 | 31.4 | 23.0 | 55.8 |
| Ricon 130 | 14.0 | 19.1 | 14.0 | 37.2 |
| A172 | 2.0 | 2.7 | 2.0 | 4.6 |
| PC 085 | 1.0 | 1.4 | 1.0 | 2.4 |
| Silica | 60 | — | — | — |
| Boron Nitride PT 120 | — | 45.4 | — | — |
| Boron Nitride HCV | — | — | 60 | — |
| Viscosity (Pa-s) | 8 | 8 | 10 | — |
| Modulus (MPa) | 1,000 | 800 | 800 | 500 |
| % Moisture Absorption (*) | 0.07 | 0.1 | 0.1 | 0.12 |
| Adhesion Strength (**) (psi) | 800 | 1,250 | 1,300 | 950 |

TABLE 3-continued

|  | G | H | I | J |
|---|---|---|---|---|
| T/C 100 Cycles (−65–150° C.) | Cracks | No Crack | No Crack | Cracks |
| Thermal Conductivity w/m °C. | 0.5 | 1.0 | 1.5 | 0.3 |

(*) 85° C./85% RH/168 hrs.
(**) Cured 2 minutes @ 150° C.

Examples of organosilicon-containing compositions with silver are shown in Tables 4 and 5, which describe Examples K through N and O through R, respectively. In the examples of Table 4, four compositions with silver flakes (numbered 1 through 4) are described. In the footnote, the character of the silver flake is indicated, including, where appropriate, the particular lubricant which coats the particles and/or whether the lubricant was removed by solvent washing. Actually, solvent washing reduces the amount of lubricant present but generally does not totally remove it. Lubricant is removed to enable the adverse effect of the lubricant on the platinum catalyst present in the Sycar to be overcome by the addition of still more platinum catalyst. It will be noted that all of the examples include some added amount of platinum catalyst (PC 085). In addition, it may be seen that in compositions K and M, which contain silver flakes, 1 and 3, respectively, which were not subject to solvent washing, did not cure at 150° C. in five minutes. In contrast, Examples L and N, in which the surfactant coating on the silver flake particles, 2 and 4, was reduced by solvent washing, cured well and also displayed no cracks after thermal cycling. Solvent washing may be advantageously performed using a Hobart mixer and a mixture of 25/75 silver/acetone slurry mixing for about two hours. The liquid slurry is poured through a vacuum filter and subjected to vacuum for two hours, after which the silver is dried at 75° C. in an oven for 16 hours.

TABLE 4

|  | K | L | M | N |
|---|---|---|---|---|
| Sycar | 11.5 | 11.5 | 8.6 | 8.6 |
| Ricon 130 | 7.0 | 7.0 | 5.3 | 5.3 |
| A172 | 1.0 | 1.0 | 0.7 | 0.7 |
| PC 085 | 0.5 | 0.5 | 0.4 | 0.4 |
| Ag Flake 1 | 80 | — | — | — |
| Ag Flake 2 | — | 80 | — | — |
| Ag Flake 3 | — | — | 85 | — |
| Ag Flake 4 | — | — | — | 85 |
| 150° C./5' | No Cure | Cured | No Cure | Cured |
| Viscosity (Pa-s) | 5 | 5 | 8 | 8 |
| Modulus (MPa) | — | 800 | 800 | 800 |
| % Moisture Absorption | — | 0.07% | — | 0.07% |
| Adhesion, psi | — | 800 | — | 850 |
| Temp/cycle (1,000 Cycles) | — | No Crack | — | No Crack |
| V.R (ohm · cm) | — | $5 \times 10^{-4}$ | — | $5 \times 10^{-4}$ |

Ag Flake 1 - standard flake, with Behenic acid coated
Ag Flake 2 - standard flake, surfactant removed by solvent wash to enable addition of more catalyst to overcome adverse effect on catalyst by remaining surfactant
Ag Flake 3 - standard flake, silver stearate coated (surfactant)
Ag Flake 4 - standard flake 3, lubricant removed by solvent wash removed by solvent wash to enable addition of more catalyst to overcome adverse effect on catalyst by remaining surfactant The average particle size of the silver is about 7 to 15 microns, with a maximum of about 50 microns. The silver flake may be coated with vinyl silanes to enhance adhesion and toughness.

Additional examples of the organosilicon-containing composition with silver appear in Table 5 as Examples O, P, Q and R. Table 5 also shows the DSC peak temperature, cured modulus and adhesion properties for these examples. Also to be noted are the various types of commercial silver and lubricant type, and condition, for the commercial silver used in these examples. In particular, it is noted that silver "AAR595" is coated with an unsaturated fatty acid alcohol which was partially removed by solvent washing, but that silver designated RA101, which is a derivative of unsaturated fatty acid, did not require washing and did not "poison" the catalyst, as indicated by the cured modulus and adhesion properties listed in Table 5. Similarly, silver designated AA1176, though coated with an unsaturated fatty acid alcohol as was AAR595, was additionally treated with organosilane with satisfactory results. It is apparent that it is possible that commercial silver having a suitable surfactant that does not reduce the effectiveness of the platinum catalyst is most desirable. The term "poison the catalyst" is a term of art referring to the phenomenon of reducing the effectiveness of the catalyst.

TABLE 5

|  | O | P | Q | R |
|---|---|---|---|---|
| Sycar | 11.5 | 11.5 | 8.6 | 57.5 |
| Polybutadiene (Ricon 120) | 7.0 | 7.0 | 5.3 | 35.0 |
| A172 | 1.0 | 1.0 | 0.75 | 5.0 |
| Pt Catalyst (PC085) | 0.5 | 0.5 | 0.35 | 2.5 |
| Ag (AAR595) | 80 | — | — | — |
| Ag (RA101) | — | 80 | — | — |
| Ag (AA1176) | — | — | 85 | — |
|  | 100 | 100 | 100 | 100 |
| DSC Peak, °C. Temperature | 92.4 | 91.4 | 89.8 | 87.4 |
| Cured Modulus (MPa) (*) | 800 | 800 | 870 | 600 |
| Adhesion (psi) (*) | 1,200 | 1,200 | 1,250 | 800 |

| Silver | Lubricant Type |
|---|---|
| AAR 595 (Chemet Corp., Attleboro, Massachusetts) | Unsaturated fatty acid alcohol, but partially remove by solvent wash |
| RA101 (Chemet Corp., Attleboro, Massachusetts) | Derivative of unsaturated fatty acid |
| AA1176 (Chemet Corp., Attleboro, Massachusetts) | Unsaturated fatty acid alcohol, but additional treated with organosilane. |

(*) Cured at 150° C. for 30 minutes
Note:
Example of commercial silver that did not poison cure reaction.

The organosilicon-containing composition described provides improved adhesion, thermal conductivity and absence of cracking during thermal cycling. These properties are all important for adhesive compositions used in the electronics industry. In general, the adhesion depends on the ratio of Sycar to rubber in the range of 40 to 90 wt. % Sycar and 10 to 60 wt. % Ricon. For a given ratio of Sycar to rubber, the addition of boron nitride improves adhesion and reduces or eliminates cracking. Using silver particles with suitable surfactant allows the composition to be formulated as an electrically conductive paste which is curable in not more than three hours at 150° C. without cracking during thermal cycling. Moreover, the composition with silver has no adverse effect on adhesion, i.e., it has substantially the same adhesion properties as the composition without silver. Advantageously, the average boron nitride particle size will be in the range of about 8 to 14 microns, with a maximum of about 50 microns when the composition is intended for use as a die attach adhesive. In applications such as glob top encapsulation, larger particle size can be used, e.g., up to about 100 microns.

It is apparent from the foregoing that various changes and modifications may be made without departing from the invention.

Accordingly, the scope of the invention should be limited only by the amended claims, wherein what is claimed is:

1. An organosilicon-containing composition suitable for use as an adhesive and capable of rapid curing at low temperature comprising about 10 to 80 wt. % of an organic compound component and about 20 to 90 wt. % of one of boron nitride and silver; said organic compound component comprising the reaction product of about 40 to 90 wt. % reaction product of cyclic olefin and cyclic siloxane and about 10 to 60 wt. % rubber in liquid form.

2. An organosilicon-containing composition according to claim 1 comprising about 20 to 60 wt. % boron nitride.

3. An organosilicon-containing composition according to claim 1 comprising about 60 to 90 wt. % silver particles with or without a coating of surfactant.

4. An organosilicon-containing component according to claim 1 wherein the organic compound component further comprises about 1 to 5 wt. % of platinum catalyst and about 2 to 10 wt. % of vinyl silane.

5. An organosilicon-containing composition according to claim 3 wherein the organic compound component further comprising about 1 to 5 wt. % of platinum catalyst in liquid form and about 2 to 10 wt. % of vinyl silane, wherein either the surfactant coating is one that does not significantly poison the platinum catalyst or the amount of platinum catalyst is sufficient to overcome adverse effects of the surfactant present.

6. An organosilicon-containing composition according to claim 1 in the form of a paste capable of being cured in not more than about 3 hours at 150° C. and does not crack during thermal cycling.

7. An organosilicon-containing composition according to claim 1 with boron nitride, said boron nitride being in the form of particles less than about 50 microns in size.

8. An organosilicon-containing composition according to claim 1 further including a rheology adjusting agent.

9. An organosilicon-containing composition according to claim 8 wherein said rheology adjusting agent comprises silica particles less than about 1 micron in size.

10. An organosilicon-containing composition according to claim 1 in the form of a paste.

11. An organosilicon-containing composition according to claim 4 wherein the platinum catalyst comprises platinum siloxane with about 2 wt. % platinum.

* * * * *

UNITED STATES PATENT AND TRADEMARK OFFICE
CERTIFICATE OF CORRECTION

PATENT NO. : 5,859,105
DATED : January 12, 1999
INVENTOR(S) : My N. Nguyen

It is certified that error appears in the above-identified patent and that said Letters Patent is hereby corrected as shown below:

Column 1, lines 21,22, replace "Ser. No. 081629,826 now abandoned filed Apr. 10, 1996." with -- Ser. No. 08/629,826 filed Apr. 10, 1996, now abandoned. -- .
Column 2, line 35, change "inc.," to -- Inc., --.
Column 4, line 49, in Column M delete "800".
Column 4, line 54, change "V.R" to -- V.R. --.
Column 5, line 36, change "remove" to -- removed --.
Column 5, line 38, change "additional" to -- additionally --.
Column 6, line 12, replace "amended" with -- appended --.

Signed and Sealed this

Eighth Day of February, 2000

*Attest:*

Q. TODD DICKINSON

*Attesting Officer*  *Commissioner of Patents and Trademarks*